United States Patent

[11] 3,597,609

| [72] | Inventors | Klaus Anger;<br>Dieter Braun; Fred Fox, all of Berlin, Germany |
|---|---|---|
| [21] | Appl. No. | 853,654 |
| [22] | Filed | Aug. 28, 1969 |
| [45] | Patented | Aug. 3, 1971 |
| [73] | Assignee | Siemens Aktiengesellschaft<br>Munich, Berlin, Germany |
| [32] | Priority | Sept. 2, 1968 |
| [33] | | Switzerland |
| [31] | | 13147/68 |

[54] METHOD OF IMAGE FOCUSING IN PARTICLE-BEAM APPARATUS COMPRISING CHANGING THE BEAM INCIDENCE ANGLE AT 10 TO 15 HERTZ
2 Claims, 1 Drawing Fig.

[52] U.S. Cl. .................................................. 250/49.5 A,
 250/49.51 E
[51] Int. Cl. .................................................. H01j 37/26
[50] Field of Search .......................................... 250/49.51,
 49.55, 49.54

[56] References Cited
UNITED STATES PATENTS

| 2,464,396 | 3/1949 | Hillier | 250/49.5 |
|---|---|---|---|
| 2,547,994 | 4/1951 | Bertein | 250/49.5 |
| 2,627,589 | 2/1953 | Ellis | 250/49.5 |
| 2,986,634 | 5/1961 | Le Poole | 250/49.5 |

*Primary Examiner*—James W. Lawrence
*Assistant Examiner*—C. E. Church
*Attorneys*—Curt M. Avery, Arthur E. Wilfond, Herbert L. Lerner and Daniel J. Tick ABSTRACT: A method of focusing the image of a beam-transmissive specimen formed by the electrooptical lens system in a particle-beam apparatus equipped with beam deflectors including imaging the specimen on an image plane and varying the direction of incidence of the beam upon the specimen periodically by electrically exciting the beam deflectors at a frequency of from 10 to 15 Hz. The image is observed and the excitation of at least one of the lenses comprising the lens system is adjusted to focus the image while the direction of the beam is varied.

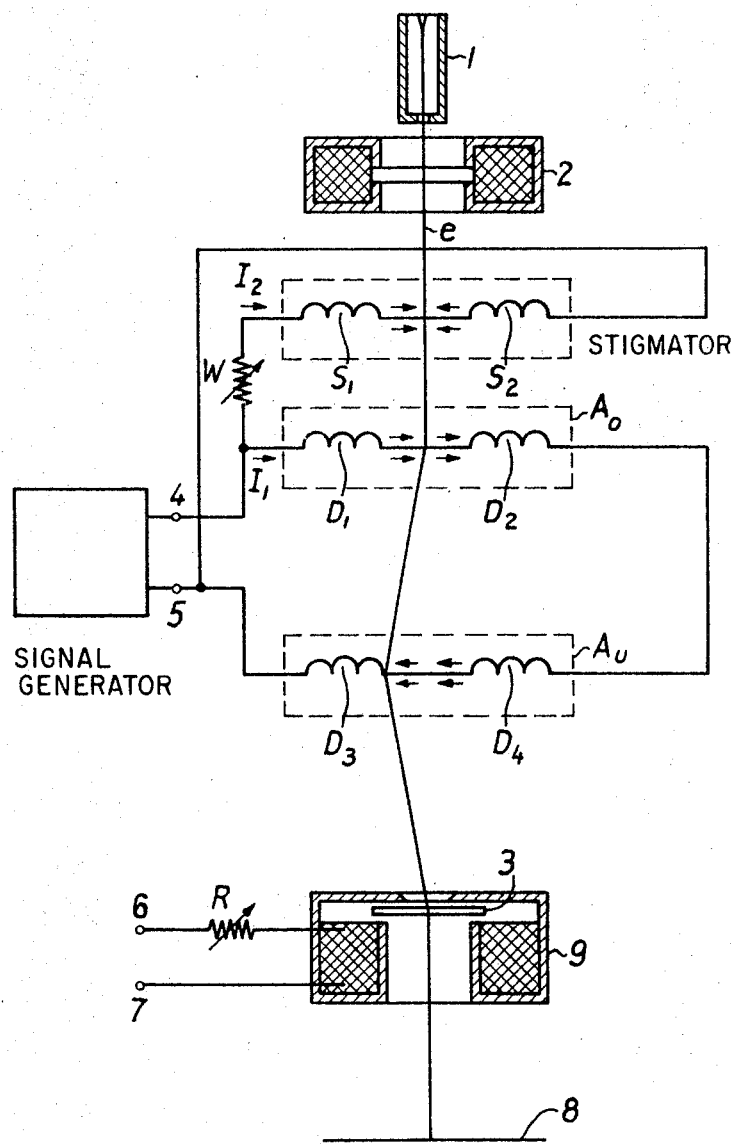

METHOD OF IMAGE FOCUSING IN PARTICLE-BEAM APPARATUS COMPRISING CHANGING THE BEAM INCIDENCE ANGLE AT 10 TO 15 HERTZ

Our invention relates to a method of focusing an image of a beam transmissive specimen.

It is known that it is difficult to focus the enlarged image of specimens, or of specimen details, obtained in particle beam apparatus employing electron-optical lens systems, for example electron microscopes. This difficulty is primarily due to the fact that a small radiation aperture is required in order to provide good contrast and a high image resolution during the actual investigation of the specimen or object, but this leads to a great depth of focus, which makes precise focusing more difficult.

The depth of focus could be reduced by enlarging the radiation aperture temporarily whilst adjusting the focusing of the lens system, in particular of the objective lens. However, the interdependence of the radiation intensity and the radiation aperture would then make its presence felt in disadvantageous fashion, since with such a process there would be differing relationships during the focusing of the image and the evaluation of the same by photographic or visual examination.

To avoid this disadvantage, a system is described in U.S. Pat. No. 2,464,396 in which an apparent enlargement of the radiation aperture is obtained without changing the radiation intensity by the provision of deflection means which periodically deflect the beam incident upon the specimen, to produce a periodic change of the direction of incidence of the beam on the specimen.

It is an object of our invention to provide a method for focusing the image of a beam transmissive specimen.

It is another object of our invention to provide a method of focusing an enlarged image of a beam transmissive specimen without changing the radiation intensity.

More specifically, the invention relates to a method of focusing an enlarged image of a transmissive specimen formed by the electro-optical lens system of a particle-beam apparatus provided with deflection means for periodically varying the direction of incidence of the beam on the specimen at a frequency of from 10 to 15 Hz. The image is observed and at least one of the lenses comprising the lens system is adjusted to focus the image while the beam direction is varied.

Investigations have shown that the quality of the focusing achieved by visual observation of the image, for example, when produced on a final image screen or on the screen of a television apparatus is to a considerable extent dependent upon the frequency of the periodic direction change of the occurring beam. For this reason, the periodic change of the radiation direction is effected at a frequency of from 10 to 15 Hz. It has been found that movements in the image occurring in this frequency range, which is just below the flicker-limit of the human eye, are particularly objectionable to the observer, so that the necessary adjustment is particularly noticeable.

Furthermore, it has been found that the frequency range of 10 to 15 Hz. leads to the possibility of carrying out focusing of the image at greater enlargements, and this applies in particular to the setting of a stigmator to a stigmatism minimum.

The invention will now be described with reference to an electron microscope, in which a conventional electron-optical lens system is provided with deflection coils or deflection plates in the path between the last condenser lens and the specimen.

A particle-beam apparatus suitable for performing the method of the invention, as for example, an electron microscope, is equipped in its radiation portion with deflection coils or deflection plates between the last condenser lens and the specimen. An electrical power source is connected to these deflection coils or plates to supply a waveform having a frequency of 10 to 15 Hz. Preferably, two deflection arrangements are provided, one above the other, of which the first deflects the beam from the beam axis, and the second deflects the beam back to the desired specimen point. Typical of such deflection arrangements is that disclosed in copending application Ser. No. 623,110, filed Mar. 14, 1967, now U.S. Pat. No. 3,453,485 assigned to the assignee of the present invention.

The invention will be further described with reference to the drawing which is a beam-path diagram of an electron-microscope comprising deflection coils disposed intermediate the last condenser lens and the plane of the specimen.

In the drawing, an electron gun 1 issues a beam of electrons $e$ which passes through a magnetic condenser lens 2, the latter being the last condenser lens in beam direction. A stigmator and deflector system comprising deflector units $A_o$ and $A_u$ are located intermediate condenser lens 2 and a specimen 3. The stigmator consists of four coils arranged in a plane about the beam axis at respective positions spaced 90 apart. Each two of the coils constitute a pair and are disposed diametrically opposite each other. The stigmator coils are inclined toward the deflection coils at an angle less than 45°. The stigmator is schematically represented in the drawing by two coils $S_1$ and $S_2$.

A signal generator impressed between the terminals 4 and 5 provides an excitation current $I$ having a frequency in the range of 10 to 15 Hz. A portion of this current $I$, excites the upper and lower deflection units $A_o$, $A_u$ of the deflector system. The upper deflector unit $A_o$ comprises a pair of coils $D_1$ and $D_2$. The lower unit $A_u$ comprises a pair of coils $D_3$ and $D_4$. The coils $D_1$ and $D_2$ are traversed by the current $I_1$ in the same direction so that a magnetic field is formed between them in the direction indicated by arrows. The coils $D_3$ and $D_4$ of the lower unit $A_u$ are likewise traversed in the same direction by the excitation current $I_1$ and produce a magnetic field whose direction is also indicated by arrows.

The electron beam $e$, when entering from the electron gun 1, into the active region of the magnetic field produced by the coils $D_1$ and $D_2$, becomes deflected in a direction perpendicular to the direction of the field. This direction of deflection is toward the front, namely out of the plane of illustration toward the observer. When the beam passes through the magnetic field produced between the coils $D_3$ and $D_4$, it becomes deflected back toward the original axis and then will someway impinge upon an object 3. It will be understood that the deflected beam does not impinge upon coil $D_3$ (nor on any of the other coils) but—seen by the observer—extends past the coil $D_3$ in front of the plane of illustration.

The signal generator is also connected to the stigmator. Due to this circuit connection, the excitation of the stigmator coils is directly proportional to the excitation of the deflector coils. The stigmator coils $S_1$ and $S_2$ are so poled that a current $I_2$ driven through the coils by the signal generator will produce mutually opposed magnetic fields, this being indicated by arrows pointing toward each other. This magnetic field in the stigmator causes a predistortion of the beam $e$. As a result, the distortion resulting from the effect of the upper and lower deflector units $A_o$ and $A_u$ is nearly eliminated.

The compensation of deflecting astigmatism requires the coils $S_1$ and $S_2$ of the stigmator to be excited in opposition to each other. Complete compensation of deflecting astigmatism further requires that the coils $S_1$ and $S_2$, with respect to their common center axis, be arranged perpendicularly to the magnetic fields of the deflector units $A_o$ and $A_u$ as well as perpendicularly to the direction of the electron beam.

For adapting the stigmator to the deflector system of units $A_o$ and $A_u$, the coil circuit of the stigmator is provided with resistor means of variable or adjustable resistance. These resistor means may be constituted by a resistor network but, as shown, may also consist of a single adjustable resistor W. In any event, the resistor means are also traversed by the stigmator excitation current $I_2$.

By periodically changing the direction of the beam direction at a frequency of from 10 to 15 Hz. and simultaneously observing the specimen image on the screen 8, the quality of focusing of the objective lens 9 is adjusted by changing its excitation, for example, by positioning the variable resistor R.

An excitation current is supplied to lens 9 by a suitable current source connected to terminals 6 and 7.

To those skilled in the art it will be obvious upon a study of this disclosure that our invention permits of various modifications and may be given embodiments other than particularly illustrated herein, without departing from the essential features of the invention and within the scope of the claims annexed hereto.

We claim:

1. The method of focusing the image of a beam transmissive specimen formed by an electro-optical lens system in a particle-beam apparatus equipped with beam deflection means, which comprises imaging the specimen on an image plane, varying the direction of incidence of the beam upon the specimen periodically by electrically exciting the beam deflection means at a frequency of from 10 to 15 Hz. thereby producing a flickering image, observing the image and adjusting the excitation of at least one of the lenses of the lens system to focus the image while the direction of the beam is varied.

2. The method according to claim 1, which comprises the additional step of adjusting the excitation of a stigmator included in said lens system while the direction of said beam is varied.